(12) United States Patent
Lee

(10) Patent No.: US 8,588,572 B2
(45) Date of Patent: Nov. 19, 2013

(54) ELECTROMAGNETIC INTERFERENCE (EMI) WAVEGUIDE DEVICE FOR USE IN A PARALLEL OPTICAL COMMUNICATIONS MODULE, AND A METHOD

(75) Inventor: Chi K. Lee, Palo Alto, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 175 days.

(21) Appl. No.: 13/305,355

(22) Filed: Nov. 28, 2011

(65) Prior Publication Data
US 2013/0133181 A1 May 30, 2013

(51) Int. Cl.
*G02B 6/44* (2006.01)
*G02B 6/36* (2006.01)

(52) U.S. Cl.
USPC .............. 385/135; 385/75; 385/92; 385/136

(58) Field of Classification Search
None
See application file for complete search history.

(56) References Cited

U.S. PATENT DOCUMENTS

| | | |
|---|---|---|
| 4,932,673 A | 6/1990 | Domnikov |
| 6,713,672 B1 | 3/2004 | Stickney |
| 6,822,162 B1 | 11/2004 | Valentine |
| 6,860,641 B1 | 3/2005 | Goldenburg |
| 7,342,184 B2 | 3/2008 | Cochrane |
| 2002/0150344 A1* | 10/2002 | Chiu et al. ............ 385/53 |

* cited by examiner

*Primary Examiner* — Jerry Rahll

(57) ABSTRACT

A parallel optical communications module is equipped with an EMI waveguide (WG) device having a tube-like structure that surrounds portions of one or more optical fiber ribbon cables that pass through the tube-like structure and connect to the module. The EMI WG device attenuates EMI to acceptable levels to provide the module with effective EMI shielding capability.

26 Claims, 4 Drawing Sheets

ELECTROMAGNETIC INTERFERENCE (EMI) WAVEGUIDE DEVICE FOR USE IN A PARALLEL OPTICAL COMMUNICATIONS MODULE, AND A METHOD

TECHNICAL FIELD OF THE INVENTION

The invention relates to optical communications modules. More particularly, the invention relates to an electromagnetic interference (EMI) waveguide (WG) device for attenuating EMI in a parallel optical communications module.

BACKGROUND OF THE INVENTION

A variety of optical communications modules are used in optical networks for transmitting and receiving optical data signals over the networks. An optical communications module may be an optical receiver module that has optical receiving capability, but not optical transmitting capability. Alternatively, an optical communications module may be an optical transmitter module that has optical transmitting capability, but not optical receiving capability. Alternatively, an optical communications module may be an optical transceiver module that has both optical transmitting and optical receiving capability.

A typical optical transmitter or transceiver module has a transmit (Tx) portion that includes a laser driver circuit and at least one laser diode. The laser driver circuit outputs an electrical drive signal to each respective laser diode to cause the respective laser diode to be modulated. When the laser diode is modulated, it outputs optical signals that have power levels corresponding to logic 1s and logic 0s. An optics system of the module focuses the optical signals produced by each respective laser diode into the end of a respective transmit optical fiber held within an optical connector module that connects to the optical transmitter or transceiver module.

A typical optical receiver or transceiver module has a receive (Rx) portion that includes at least one receive photodiode that receives an incoming optical signal output from the end of a respective receive optical fiber held in an optical connector module. The optics system of the receiver or transceiver module focuses the light that is output from the end of each receive optical fiber onto the respective receive photodiode. The respective receive photodiode converts the incoming optical signal into an electrical analog signal. An electrical detection circuit, such as a transimpedance amplifier (TIA), receives the electrical signal produced by the receive photodiode and outputs a corresponding amplified electrical signal, which is processed by other circuitry of the Rx portion to recover the data.

Some optical transceiver modules have a single laser diode in the Tx portion and a single photodiode in the Rx portion for simultaneously transmitting and receiving optical signals over transmit and receive fibers, respectively, of transmit and receive optical cables, respectively. The ends of the transmit and receive cables have optical connector modules on them that are adapted to plug into transmit and receive receptacles, respectively, formed in the optical communications module. These types of optical communications modules are often referred to as pluggable modules. Small form-factor pluggable (SFP) and SFP+ communications modules are examples of pluggable optical communications modules.

Some optical communications modules have multiple laser diodes and/or multiple photodiodes for simultaneously transmitting and/or receiving multiple optical signals. In these types of optical modules, which are commonly referred to as parallel optical modules, the transmit fiber cables and the receive fiber cables have multiple transmit optical fibers and multiple receive optical fibers, respectively. The cables are typically ribbon cables having ends that are terminated in an optical connector module that is configured to be plugged into a receptacle of the parallel optical communications module.

The Federal Communications Commission (FCC) has set standards that limit the amount of electromagnetic radiation that may emanate from unintended sources. For this reason, a variety of techniques and designs are used to shield EMI open apertures in optical communications module housings in order to limit the amount of EMI that passes through the apertures. Various metal shielding designs and resins that contain metallic material have been used to cover areas from which EMI may escape from the housings. So far, such techniques and designs have had only limited success, especially with respect to parallel optical communications modules that transmit and/or receive data at high data rates (e.g., 10 gigabits per second (Gbps) and higher) over multiple parallel channels.

The amount of EMI that passes through an EMI shielding device is proportional to the largest dimension of the largest EMI open aperture of the EMI shielding device. Therefore, EMI shielding devices such as EMI collars and other devices are designed to ensure that there is no open aperture that has a dimension that exceeds the maximum allowable EMI open aperture dimension associated with the frequency of interest.

In parallel optical transceiver modules, the optical cables that carry the fibers are typically ribbon cables in which the fibers are arranged side-by-side in a 1×N array, where N is the number of fibers of the ribbon cable. Thus, the transmit fibers are arranged in one 1×N fiber array in one ribbon cable and the receive fibers are arranged in another 1×N array in another ribbon cable. Typically, the ribbon cables are placed one on top of the other such that a 2×N array of fibers enter the optical connector module through a gap formed in the nose of the optical connector module. This gap constitutes an EMI open aperture that is much larger than the maximum allowable EMI open aperture dimension of the optical transceiver module, particularly at high data rates. Consequently, unacceptable amounts of EMI may escape from the optical transceiver module through the gap.

Accordingly, a need exists for an EMI shielding device and a method that provide effective EMI attenuation at the gap in the optical communications module through which the optical fiber ribbon cables pass.

SUMMARY OF THE INVENTION

The invention is directed to an EMI waveguide WG device for use in a parallel optical communications module and a method for providing EMI shielding in a parallel optical communications module. The EMI WG device comprises a generally flat cover, a tube-like structure, and an electrically conductive gasket. The cover is made of an electrically-conductive material and has a mounting portion for mechanically coupling the cover to a metal housing of the parallel optical communications module. The tube-like structure is made of an electrically-conductive material and has an effective length, L, and an effective diagonal dimension, D. The effective diagonal dimension, D, is sufficiently large to accommodate at least one optical fiber ribbon cable to enable a portion of the optical fiber ribbon cable to pass through an opening in the tube-like structure that is defined by interior surfaces of the tube-like structure. The opening has the effective diagonal dimension, D. The cover and the tube-like structure provide EMI shielding for the parallel optical communications module when the EMI WG device is installed in the metal housing. The gasket is made of an electrically-conductive material and wraps around at least a portion of the first end of the tube-like structure. The gasket is disposed to come into contact with a metal housing of the parallel optical communications module when the EMI WG device is installed in the parallel optical communications module to electrically ground the EMI WG device to the metal housing.

The method comprises installing an EMI WG device in a metal housing of a parallel optical communications module The EMI WG device comprises a generally flat cover, a tube-like structure, and a gasket. The cover is made of an electrically-conductive material. A mounting portion of the cover is mechanically coupled to the metal housing. The tube-like structure is made of an electrically-conductive material and has a first end that is mechanically coupled to the cover. The tube-like structure has an effective length, L, and an effective diagonal dimension, D. The effective diagonal dimension, D, is sufficiently large to accommodate at least one optical fiber ribbon cable. A portion of said at least one optical fiber ribbon cable passes through an opening in the tube-like structure that is defined by interior surfaces of the tube-like structure. The opening has the effective diagonal dimension, D. The gasket is made of an electrically conductive material. The gasket wraps around at least a portion of the first end of the tube-like structure. The gasket is in contact with the metal housing and electrically grounds the EMI WG device to the metal housing.

These and other features and advantages of the invention will become apparent from the following description, drawings and claims.

DETAILED DESCRIPTION OF AN ILLUSTRATIVE EMBODIMENT

In accordance with the invention, a parallel optical communications module is equipped with an EMI waveguide (WG) device having a tube-like structure that surrounds portions of one or more optical fiber ribbon cables that pass through the EMI WG device and into the module housing. The EMI WG device attenuates EMI to acceptable levels to provide the module with effective EMI shielding capability. Illustrative, or exemplary, embodiments of the EMI WG device will now be described with reference to FIGS. 1-5.

Figure 1:
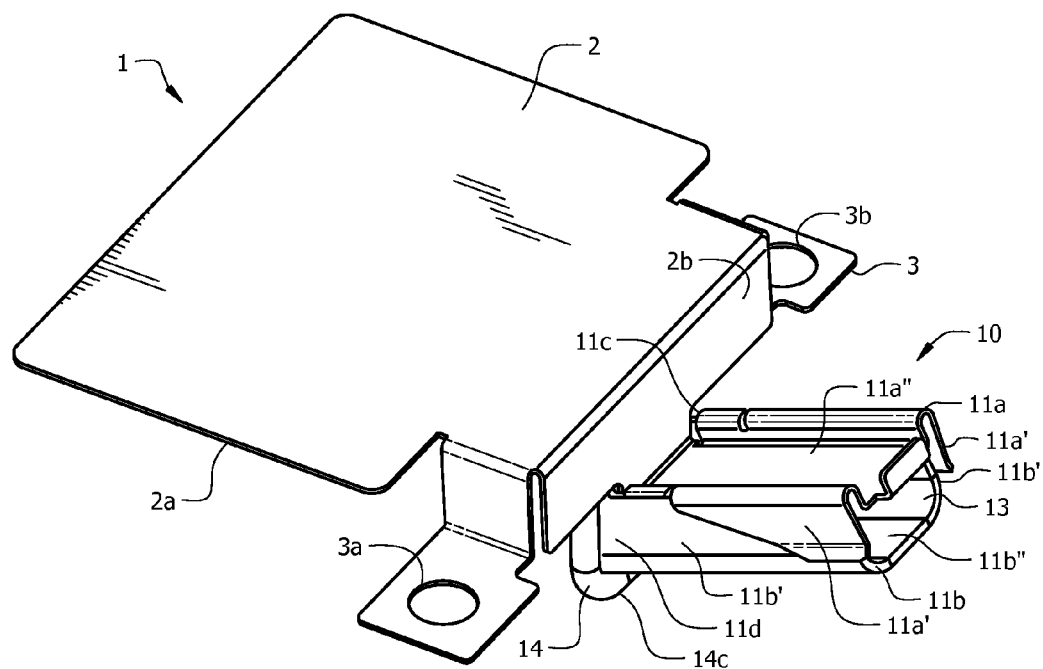
FIG. 1 illustrates a perspective view of the EMI WG device in accordance with an illustrative embodiment.
Figure 2:
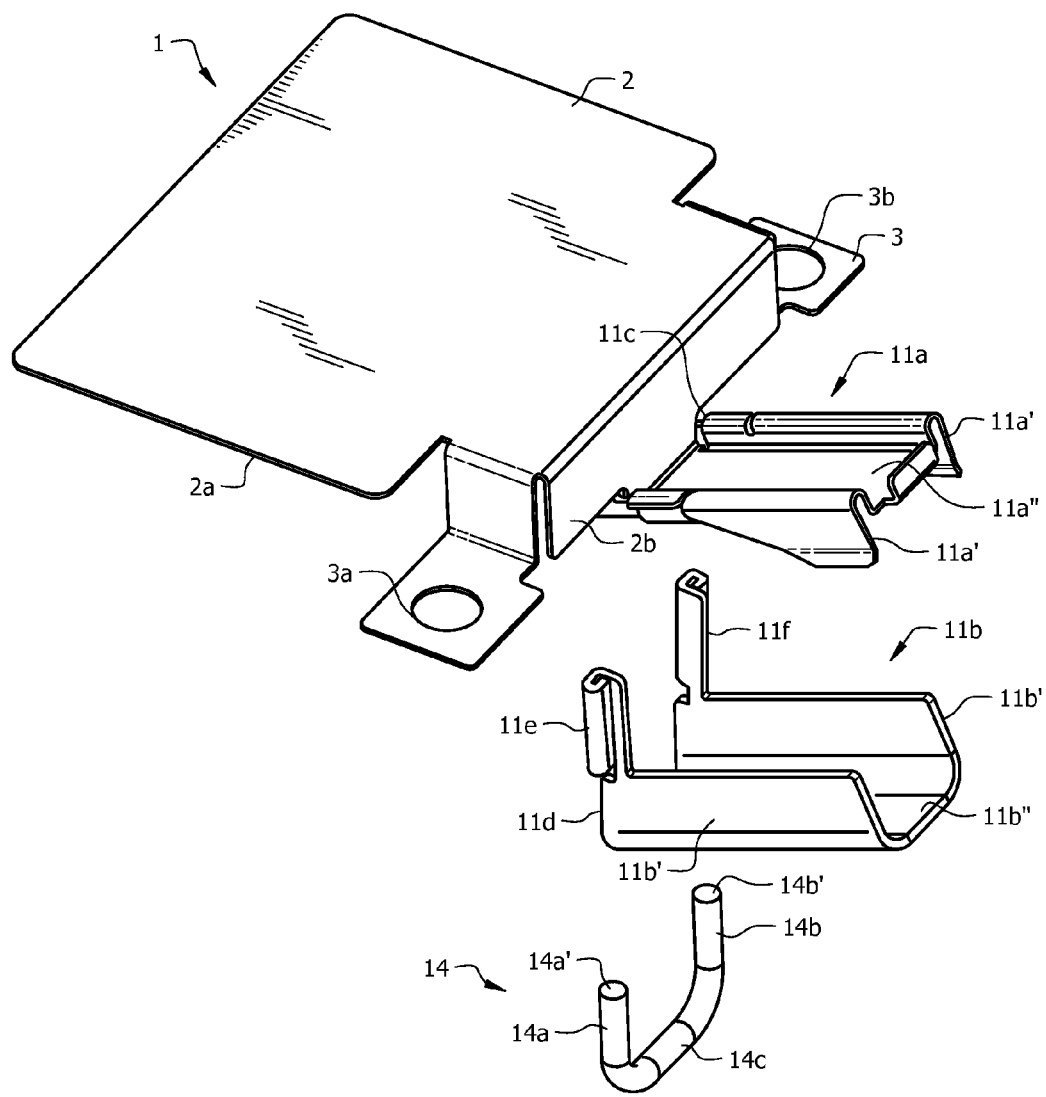
FIG. 2 illustrates a perspective view of the EMI WG device shown in FIG. 1 in its disassembled form to more fully show the various components of the device 1.
Figure 3:
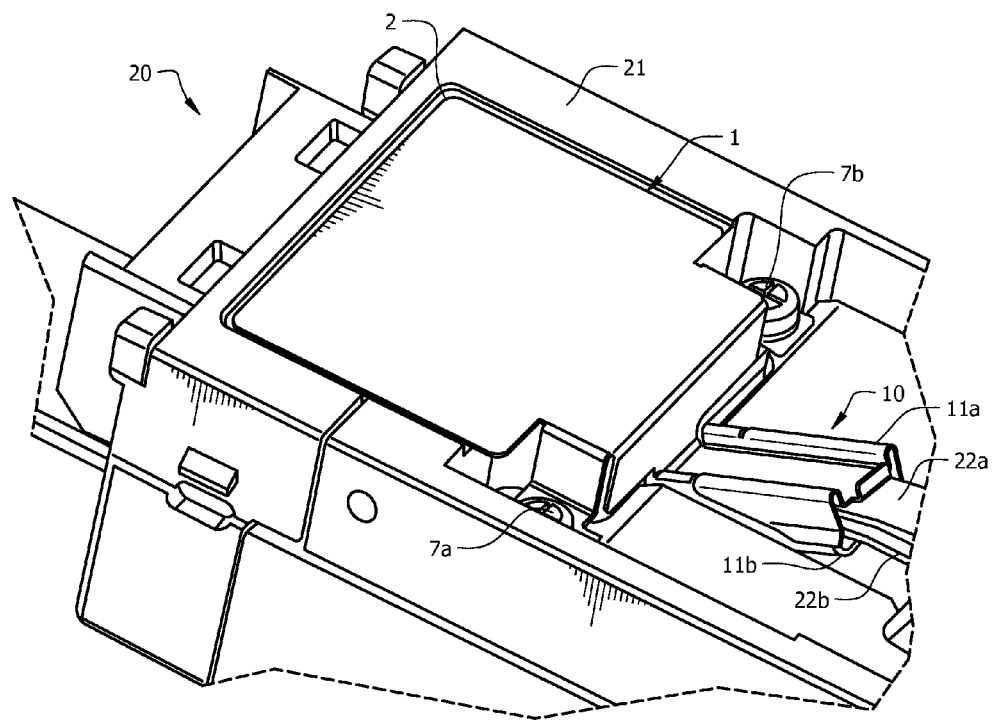
FIG. 3 illustrates a perspective view of a portion of a parallel optical communications module that incorporates the EMI WG device shown in FIGS. 1 and 2.
Figure 4:
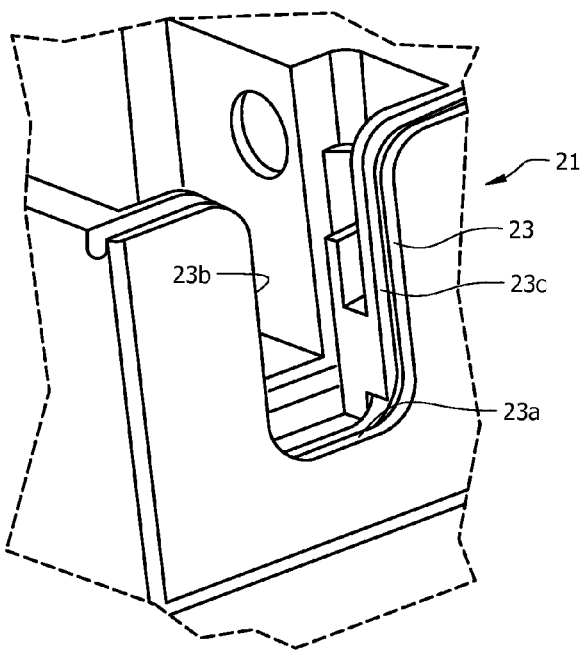
FIG. 4 illustrates a perspective view of a portion of the interior of the housing of the parallel optical communications module shown in FIG. 3.
Figure 5:
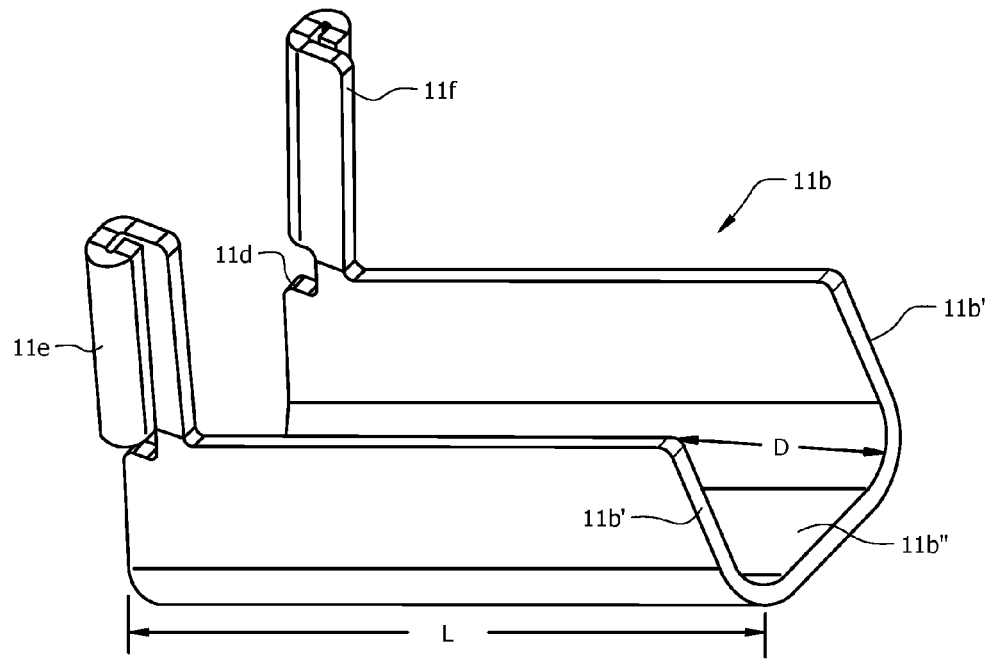
FIG. 5 illustrates a perspective view of a lower U-shaped portion of the EMI WG device shown in FIGS. 1-3.

FIG. 1 illustrates a perspective view of the EMI WG device 1 in accordance with an illustrative embodiment. FIG. 2 illustrates a perspective view of the EMI WG device 1 shown in FIG. 1 in its disassembled form to show the various components of the device 1. FIG. 3 illustrates a perspective view of a portion of a parallel optical communications module 20 that incorporates the EMI WG device 1 shown in FIGS. 1 and 2. FIG. 4 illustrates a perspective view of a portion of the interior of the housing 21 of the parallel optical communications module shown in FIG. 3. FIG. 5 illustrates a perspective view of a lower U-shaped portion 11*b* of the EMI WG device 1 shown in FIGS. 1-3. Elements or features of the EMI WG device 1 and the manner in which it is used will now be described with reference to FIGS. 1-5, in which like reference numerals represent like elements or features.

A cover 2 of the EMI WG device 1 constitutes an upper WG portion of the EMI WG device 1 (FIGS. 1 and 2). The cover 2 is generally flat and is made of an electrically conductive material, such as sheet metal, for example. A mounting flange 3 of the cover 2 is adapted for attaching the cover 2 to a housing 21 of the parallel optical communications module 20 (FIGS. 1-3). The mounting flange 3 has first and second screw-hole openings 3*a* and 3*b* formed therein through which first and second screws 7*a* and 7*b*, respectively, are inserted (FIGS. 1-3). The first and second screws 7*a* and 7*b* are screwed into respective openings (not shown) formed in the housing 21 to secure the cover 2 to the module housing 21 (FIG. 3), which is made of metal. It should be noted that attachment mechanisms other than the mounting flange 3 and the screws 7*a* and 7*b* may be used to mechanically couple the cover 2 to the housing 21. Therefore, the mounting flange 3 is merely one example of a mounting structure of the cover 2 that may be used to mechanically couple the cover 2 to the module housing 21.

When the cover 2 is secured to the housing 21 (FIG. 3), an inner surface 2*a* of the cover 2 is adjacent to an optical connector module (not shown) that is connected to the end of the first optical fiber ribbon cable 22*a*. A second optical connector module (not shown) is typically positioned beneath the first optical connector module (not shown) in a stacked arrangement, although the invention is not limited with respect to the types of optical connector modules that are used for this purpose or with respect to the manner in which they are situated in the parallel optical communications module 20. The second optical connector module (not shown) is connected to an end of the second optical fiber ribbon cable 22*b*. The first and second optical connector modules (not shown) mechanically and optical couple the ends of the optical fiber ribbon cables 22*a* and 22*b* to the parallel optical communications module 20. The manner in which optical connector modules may be used to mechanically and optically couple the ends of optical fiber ribbon cables to a parallel optical communications module is well known, and therefore will not be described herein in the interest of brevity.

A lower WG portion of the EMI WG device 1 comprises a tube-like structure 10 having an upper U-shaped portion 11*a* and a lower U-shaped portion 11*b* (FIGS. 1 and 2) The upper and lower U-shaped portions 11*a* and 11*b* are made of metal, such as sheet metal, for example. The upper U-shaped portion 11*a* is inverted and coupled with the lower U-shaped portion 11*b* to form the tube-like structure 10 (FIGS. 1 and 3) having an opening 13 therein that is defined by the interior surfaces of the tube-like structure 10. The upper U-shaped portion 11*a* has side flanges 11*a*' that overlap and are exterior to side walls 11*b*' of the lower U-shaped portion 11*b*. The upper U-shaped portion 11*a* has a base portion 11*a*" that constitutes an upper surface of the tube-like structure 10. The lower U-shaped portion 11*b* has a base portion 11*b*" that constitutes a lower surface of the tube-like structure 10. The side flanges 11*a*' of the upper U-shaped portion 11*a* and the side walls 11*b*' of the lower U-shaped portion 11*b* together constitute the sides of the tube-like structure 10.

When the side walls 11*b*' of the lower U-shaped portion 11*b* are engaged with the side flanges 11*a*' of the upper U-shaped portion 11*a*, as shown in FIGS. 1 and 3, the upper edges of the side walls 11*b*' are seated in grooves that exist at the intersections of the side flanges 11a' and the base portion 11a" of the upper U-shaped portion 11a. This mechanical coupling arrangement reduces the vertical distance between the base portion 11a" of the upper U-shaped portion 11a and the base portion 11b" of the lower U-shaped portion 11b. Reducing this vertical distance reduces the diagonal dimension of the opening 13 defined by the interior surfaces of the tube-like structure 10, which, as described below, improves EMI shielding effectiveness.

The upper U-shaped portion 11a has a first end 11c that is connected to the cover 2. The lower U-shaped portion 11b has a first end 11d that is pressed against the first end 11c of the upper U-shaped portion 11a by an electrically-conductive U-shaped gasket 14. The gasket 14 wraps around, and is in contact with, the exterior surface of the first end 11d of the lower U-shaped portion 11b. The U-shaped gasket 14 is typically made of an elastomeric material, such as silicon, for example, that is impregnated with an electrically-conductive material, such as silver, for example. Using an elastomeric material for the gasket 14 provides the gasket 14 with a degree of elasticity that ensures that the gasket 14 snugly grips, and remains in continuous contact with, the exterior surface of the first end 11d of the lower U-shaped portion 11b.

The electrically-conductive gasket 14 serves to electrically ground the EMI WG device 1 to the metal module housing 21. The gasket 14 has vertical arms 14a and 14b that are interconnected by a horizontal base portion 14c of the gasket 14. Upper ends 14a' and 14b' of the vertical arms 14a and 14b, respectively, are in abutment with the lower surface 2a of the cover 2 when the EMI WG device 1 is in its assembled form shown in FIGS. 1 and 3. The manner in which the EMI WG device 1 is assembled will now be described with reference to FIGS. 1-4.

As shown in FIG. 4, a portion of the interior of the module housing 21 has a U-shaped channel 23 disposed therein that is sized and shaped to receive the U-shaped gasket 14. When the gasket 14 is inserted into the channel 23, the horizontal base portion 14c of the gasket is lodged in a lower portion 23a of the channel 23 and the vertical arms 14a and 14b of the gasket 14 are lodged in side portions 23b and 23c, respectively, of the channel 23. After the gasket 14 has been lodged in the channel 23, vertical arms 11e and 11f of the lower U-shaped portion 11b are inserted into the side portions 23b and 23c, respectively, of the channel 23 and lowered onto the gasket 14. When the lower U-shaped portion 11b and the gasket 14 are engaged in this manner, the elasticity of the gasket 14 ensures that the gasket 14 snugly grips, and remains in continuous contact with, the exterior surface of the first end 11d of the lower U-shaped portion 11b.

After the gasket 14 and the lower U-shaped portion 11b have been coupled with the module housing 21 and with each other in this manner, the optical connector modules (not shown) having the optical fiber ribbon cables 22a and 22b extending therefrom are connected to the parallel optical communications module 20 such that portions of the ribbon cables 22a and 22b are stacked on the base portion 11b" of the lower U-shaped portion 11b. The cover 2 having the upper U-shaped portion 11a extending from it, as shown in FIG. 1, is then secured to the module housing 21 in the manner described above using the screw holes 3a and 3b and the screws 7a and 7b (FIG. 3).

Securing the EMI WG device 1 to the module housing 21 in this manner ensures that the EMI WG device 1 is electrically grounded to the module housing 21 and that the tube-like structure 10 (FIGS. 1 and 3) surrounds the portions of the ribbon cables 22a and 22b that pass through it. As indicated above, the amount of EMI that passes through an EMI shielding device is proportional to the largest dimension of the largest EMI open aperture of the EMI shielding device. The tube-like structure 10 has an effective length, L, and an effective diagonal dimension, D. The effective length, L, is the largest EMI open aperture of the tube-like structure 10. The longer the effective length, L, the more effective the tube-like structure 10 will be at shielding EMI. Conversely, the smaller the effective diagonal dimension, D, the more effective the tube-like structure 10 will be at shielding EMI. Thus, the smaller the aspect ratio, D/L, the more effective the tube-like structure 10 will be at shielding EMI.

The effective diagonal dimension, D, must be large enough to accommodate the widths, W, of the optical fiber ribbon cables 22a and 22b, but not so large that it allows unacceptable levels of EMI to escape the module housing 21. In accordance with the illustrative embodiment, each of the optical fiber ribbon cables 22a and 22b comprises a 1×12 array of optical fibers, with each fiber carrying data at a rate of at least about 5 Gbps and typically at least about 10 Gbps. The width, W, and height, H, of each ribbon cable 22a and 22b is approximately 3.1 millimeters (mm) and 0.31 mm, respectively. In order to provide effective EMI shielding over the frequency ranges corresponding to these data rates, the upper and lower U-shaped portions 11a and 11b are designed such that when they are assembled together as shown in FIGS. 1 and 3, the effective diagonal dimension, D, is approximately 3.6 mm, and thus is sufficiently large to accommodate the two stacked 1×12 ribbon cables 22a and 22b. In accordance with this illustrative embodiment, the effective length, L, is approximately 9.0 mm. Therefore, in accordance with this illustrative embodiment, the tube-like structure 10 has an aspect ratio, D/L, of about 3.6/9.0=0.4. With the tube-like structure 10 having these dimensions, the EMI WG device 1 achieves positive decibel (dB) attenuation at the frequency of interest and up to more than three octaves above the frequency of interest, which is about 10 Gigahertz (GHz) in the illustrative embodiment. In accordance with the illustrative embodiment, the EMI WG device 1 achieves at least −10 dB "FCC Class B" transceiver module EMI margin. This level of attenuation corresponds to a very good shielding effectiveness that easily meets FCC Class B compliance criteria.

It can be seen from the above description of the illustrative embodiment that the tube-like structure 10 is sufficiently large to accommodate two optical fiber ribbon cables, but sufficiently small to provide effective EMI shielding at relatively high frequencies. Thus, the invention provides an effective EMI shielding for parallel optical communications modules that simultaneously transmit and/or receive data over multiple parallel channels at high data rates. It should be noted that the dimensions of the tube-like structure 10 will vary depending on the size of the optical fiber ribbon cable and the number of optical fiber ribbon cables that the tube-like structure 10 is designed to accommodate. While the tube-like structure 10 has been described as being designed to accommodate two optical fiber ribbon cables having twelve fibers each, the tube-like structure 10 may be designed to accommodate as few as one or more than two optical fiber ribbon cables having any number of optical fibers.

It should be noted that the invention has been described with reference to illustrative embodiments for the purposes of demonstrating the principles and concepts of the invention. Many modifications may be made to the illustrative embodiments described herein without deviating from the scope of the invention. For example, although the tube-like structure 10 is described above as being constructed of the upper and lower U-shaped portions 11a and 11b, the tube-like structure 10 could be constructed of a single piece of electrically-conductive material or of more than two pieces of electrically conductive material. Persons skilled in the art will understand, in view of the description provided herein, that all such modifications are within the scope of the invention.

What is claimed is:

1. An electromagnetic interference (EMI) waveguide (WG) device for use in a parallel optical communications module, the EMI WG device comprising:
a generally flat cover made of an electrically-conductive material, the cover having a mounting portion for mechanically coupling the cover to a metal housing of the parallel optical communications module;
a tube-like structure made of an electrically-conductive material, the tube-like structure having a first end that is mechanically coupled to the cover, the tube-like structure having an effective length, L, and an effective diagonal dimension, D, and wherein D is sufficiently large to accommodate at least one optical fiber ribbon cable to enable a portion of said at least one optical fiber ribbon cable to pass through an opening in the tube-like structure that is defined by interior surfaces of the tube-like structure, wherein the opening has the diagonal dimension, D, and wherein the cover and the tube-like structure provide EMI shielding for the parallel optical communications module when the EMI WG device is installed in the metal housing; and
an electrically-conductive gasket that wraps around at least a portion of the first end of the tube-like structure, the gasket being disposed to come into contact with a metal housing of the parallel optical communications module when the EMI WG device is installed in the parallel optical communications module to electrically ground the EMI WG device to the metal housing.

2. The EMI WG device of claim 1, wherein the tube-like structure comprises an upper U-shaped portion and a lower U-shaped portion that are coupled together to form the tube-like structure.

3. The EMI WG device of claim 2, wherein the effective diagonal dimension, D, is sufficiently large to accommodate at least two optical fiber ribbon cables to enable respective portions of the optical fiber ribbon cables to pass through the opening in the tube-like structure.

4. The EMI WG device of claim 3, wherein each of the optical fiber ribbon cables includes a 1×N array of optical fibers, where N is a positive integer that is equal to or greater than two.

5. The EMI WG device of claim 4, wherein N is equal to or greater than twelve.

6. The EMI WG device of claim 1, wherein the cover and the upper and lower U-shaped portions of the EMI WG device comprise sheet metal.

7. The EMI WG device of claim 1, wherein the gasket comprises an elastomeric material that is impregnated with an electrically conductive material to provide the gasket with elasticity and electrical conductivity characteristics.

8. The EMI WG device of claim 7, wherein the gasket is U-shaped to comply with the U-shape of the lower U-shaped portion, and wherein the elasticity characteristic of the gasket ensures that the gasket snugly grips the first end of the lower U-shaped portion and is in continuous contact therewith.

9. The EMI WG device of claim 1, wherein the effective length, L, is approximately 9.0 millimeters (mm).

10. The EMI WG device of claim 1, wherein the diagonal dimension, D, is approximately 3.6 millimeters (mm).

11. The EMI WG device of claim 1, wherein an aspect ratio of D/L is approximately 0.4.

12. The EMI WG device of claim 1, wherein the optical fiber ribbon cable includes a 1×N array of optical fibers, where N is a positive integer that is equal to or greater than two, and wherein each optical fiber carries an optical data signal having a frequency that is equal to or greater than 5 Gigahertz (GHz).

13. The EMI WG device of claim 1, wherein the optical fiber ribbon cable includes a 1×N array of optical fibers, where N is a positive integer that is equal to or greater than two, and wherein each optical fiber carries an optical data signal having a frequency that is equal to or greater than 10 Gigahertz (GHz).

14. A method for providing electromagnetic interference (EMI) shielding in a parallel optical communications module, the method comprising:
installing an electromagnetic interference (EMI) waveguide (WG) device in a metal housing of a parallel optical communications module, the EMI WG device comprising:
a generally flat cover made of an electrically-conductive material having a mounting portion that is mechanically coupled to the metal housing,
a tube-like structure made of an electrically-conductive material, the tube-like structure having a first end that is mechanically coupled to the cover, the tube-like structure having an effective length, L, and an effective diagonal dimension, D, and wherein D is sufficiently large to accommodate at least one optical fiber ribbon cable, wherein a portion of said at least one optical fiber ribbon cable passes through an opening in the tube-like structure that is defined by interior surfaces of the tube-like structure, wherein the opening has the diagonal dimension, D, and
an electrically-conductive gasket that wraps around at least a portion of the first end of the tube-like structure, the gasket is in contact with the metal housing and electrically grounds the EMI WG device to the metal housing.

15. The method of claim 14, wherein the tube-like structure comprises an upper U-shaped portion and a lower U-shaped portion that are coupled together to form the tube-like structure.

16. The method of claim 15, wherein the effective diagonal dimension, D, is sufficiently large to accommodate at least two optical fiber ribbon cables to enable respective portions of the optical fiber ribbon cables to pass through the opening in the tube-like structure.

17. The method of claim 16, wherein each of the optical fiber ribbon cables includes a 1×N array of optical fibers, where N is a positive integer that is equal to or greater than two.

18. The method of claim 17, wherein N is equal to or greater than twelve.

19. The method of claim 14, wherein the cover and the upper and lower U-shaped portions of the EMI WG device comprise sheet metal.

20. The method of claim 14, wherein the gasket comprises an elastomeric material that is impregnated with an electrically conductive material to provide the gasket with elasticity and electrical conductivity characteristics.

21. The method of claim 20, wherein the gasket is U-shaped to comply with the U-shape of the lower U-shaped portion, and wherein the elasticity characteristic of the gasket ensures that the gasket snugly grips the first end of the lower U-shaped portion and is in continuous contact therewith.

22. The method of claim 14, wherein the effective length, L, is approximately 9.0 millimeters (mm).

23. The method of claim 14, wherein the diagonal dimension, D, is approximately 3.6 millimeters (mm).

24. The method of claim 14, wherein an aspect ratio of D/L is approximately 0.4.

25. The method of claim 14, wherein the optical fiber ribbon cable includes a 1×N array of optical fibers, where N is a positive integer that is equal to or greater than two, and wherein each optical fiber carries an optical data signal having a frequency that is equal to or greater than 5 Gigahertz (GHz).

26. The method of claim 14, wherein the optical fiber ribbon cable includes a 1×N array of optical fibers, where N is a positive integer that is equal to or greater than two, and wherein each optical fiber carries an optical data signal having a frequency that is equal to or greater than 10 Gigahertz (GHz).

* * * * *